United States Patent [19]

Negro

[11] Patent Number: 4,629,628
[45] Date of Patent: Dec. 16, 1986

[54] WAFERS AND PROCESSES FOR THEIR MANUFACTURE

[75] Inventor: Giuseppe Negro, Stadtallendorf, Fed. Rep. of Germany

[73] Assignee: Ferrero oHG mbH, Frankfurt am Main, Fed. Rep. of Germany

[21] Appl. No.: 283,083

[22] Filed: Jul. 13, 1981

Related U.S. Application Data

[63] Continuation of Ser. No. 99,234, Nov. 30, 1979, abandoned.

[30] Foreign Application Priority Data

Jul. 20, 1979 [DE] Fed. Rep. of Germany ....... 2929496

[51] Int. Cl.$^4$ .......................... A21D 13/00; A21D 8/00
[52] U.S. Cl. .................................... 426/138; 426/552; 426/560
[58] Field of Search ............... 426/549, 560, 552, 502, 426/512, 382, 383, 138

[56] References Cited

U.S. PATENT DOCUMENTS

| | | | |
|---|---|---|---|
| 1,166,056 | 12/1915 | Lawrence | 426/283 |
| 3,256,804 | 6/1966 | Petrin | 99/380 |
| 3,932,679 | 1/1976 | Salza | 426/549 |
| 3,962,480 | 6/1976 | Wolf | 426/549 |
| 4,208,441 | 6/1980 | Westover | 426/293 |

OTHER PUBLICATIONS

Matz, Cookie and Cracker Technology, Avi Pub. Co. Inc., Westport, Conn., 1968, pp. 150–153.
Winter, A Consumer's Dictionary of Food Additives, Crown Pub. Inc., N.Y., 1972, p. 143.
Matz, Bakery Technology and Engineering, Avi Pub. Co. Inc., Westport, Conn., 1972, pp. 424–425 and 429–431.

*Primary Examiner*—Raymond N. Jones
*Assistant Examiner*—Elizabeth A. King
*Attorney, Agent, or Firm*—Bernard, Rothwell & Brown

[57] ABSTRACT

A process is disclosed for making a wafer which has a smooth, dense surface and a cell-like internal structure for use as a filled wafer.

2 Claims, No Drawings

WAFERS AND PROCESSES FOR THEIR MANUFACTURE

This application is a continuation of application Ser. No. 099,234 filed Nov. 30, 1979, now abandoned.

The invention relates to a wafer with a smooth, dense surface and a cell-like internal structure, and to a process for its manufacture.

Wafers are used in the foodstuff and semi-luxury foodstuff industries as containers or supports for foodstuff compositions of very diverse types. Irrespective of the nature of the foodstuff accommodated on or in the wafers, there is a requirement that the wafer should have adequate stability or strength and in particular should exhibit this during its production, during packaging, in the packed state and also when it is handled by the consumer. A requirement of equal importance is that the wafer has good organoleptic properties and in particular is delicate and crisp and optically has an appealing appearance in respect of colour and shape.

Wafers are either baked with a smooth surface on both sides or they have at least one surface provided with square-shaped indentations. The decision of the manufacturer to produce a wafer with a smooth surface or a wafer with squares depends on the desired thickness of the baked end product. It is possible to manufacture only relatively thin wafers with a smooth surface. If the amount of batter, and thus the thickness of the wafer, is increased, it is then not possible to remove the requisite amount of water during the short baking time for wafers and the consequence of this is that the wafers are baked through and crisp only on the outer surfaces but not inside. If the baking temperature is raised, there is a risk that although the wafer will be baked through it will be burned on the outer surfaces.

The thin wafers have the disadvantage that they break easily. If it is desired to make the wafer thicker, in order to avoid the risk of breaking, it is necessary to increase the surface area of the product to be baked, in order to enable the water to be removed. This is effected by providing the wafer mould with indentations, which usually are square-shaped. The increase in the surface area of the wafers baked using wafer moulds of this type, which is achieved by this means, ensures that the wafer batter has the desired baking characteristics. Moreover, it is an additional advantage that the webs or ribs of the wafer impart additional stability.

Frequently, wafers are coated with chocolate or other coating compositions. Wafers provided with squares or reinforcing ribs then have the disadvantage that they take up a relatively large amount of the expensive and calorie-rich chocolate coating composition in the indentations. In order to provide a chocolate surface which is smooth on the outside, the indentations must first be filled. This difficulty does not arise in the case of wafers with a smooth surface. The known wafers with a smooth surface, which, as indicated above, due to their mode of manufacture are also relatively thin, have an inadequate breaking strength and have therefore been less suitable for use as self-supporting, stable bodies, which do not break on handling, for receiving a filling.

The lack of stability of thin wafers with a smooth surface can be partly compensated by applying very thick chocolate coatings in order thus to increase the strength of the wafer. This again necessitates a large amount of the chocolate composition, which is not desirable for reasons of cost and the calorie level. A second possibility for increasing the stability of filled wafers with a smooth surface is to use a large number of wafer sheets which are bonded to one another by the filling (sandwich construction). In this case, thus, several wafer sheets are required and as a result of this the taste experience, which, after all, is essentially provided by the filling, becomes less intense.

There is thus a need for wafers which preferably are used as filled wafers annd which have a smooth surface, so that the application of thin chocolate coatings is made possible, and which, nevertheless, have a strength which is adequate for production and further handling up to consumption by the consumer, this increased strength not being achieved by the necessary use of a large number of wafer sheets bonded to one another by the filling composition.

The object of the invention is, thus, to provide wafers which have a smooth, dense surface and a cell-like internal structure for use as filled wafers consisting of two or more wafer sheets with an increased strength.

It is known that a number of factors determine the baking characteristics and the product characteristics—these include the organoleptic characteristics, the aesthetic appearance and the strength:

In known wafers, the weight ratio of flour to water is of the order of size of about 1:1.5. The amount of rising agents used and the composition of these agents can vary considerably, the amount being about 0.10% by weight, based on the finished batter.

Flour which is very suitable for wafers is of a variety which has low gluten and possesses strong water-binding properties. Wheat flour fulfils this condition very well. The amount of water required depends essentially on the characteristics of the flour and to a small extent also on the batter pump with which the finished batter is fed in a metered amount to the wafer iron. In addition, yolk of egg, milk powder, lecithin, chemical rising agents, fat or oil, salt and optionally also a little sugar are added, in which context it is stated in the literature (compare, for example, Gordian year 61-1454-page 26, right-hand column) that fat or oil should be used as sparingly as possible since too large a quantity makes the wafers cake-like but too small a quantity allows the wafers to stick to the baking trays. The chemical rising agents added to the batter are usually sodium carbonate (soda), sodium bicarbonate and/or ammonium carbonate (salt of hartshorn). If the rising agent consists of sodium bicarbonate, the wafer batter bakes browner than when salt of hartshorn is mixed in. For this reason, the latter is preferred as the rising agent when manufacturing white wafers.

Three known wafer batter recipes are given below:

| Recipe I | | Recipe II |
|---|---|---|
| (compare Gordian 1961, a year LXI - 1454, page 25 (569)) | | |
| Wheat flour | 25.000 kg | 25.000 kg |
| Water | 36.000 l | 36.000 l |
| Yolk of egg | 0.250 kg | 0.875 kg |
| Whole milk powder | 1.000 kg | 0.500 kg |
| Lecithin | 0.100 kg | — |
| Sodium bicarbonate | 0.150 kg | 0.035 kg |
| Salt of hartshorn | 0.050 kg | 0.350 kg |
| Fat or oil | 0.200 kg | — |
| Icing sugar | — | 0.850 kg |
| Salt | 0.050 kg | 0.050 kg |
| Egg yolk colouring | at discretion | |

| Recipe III | |
|---|---|
| (compare Gordian 1952, year LII - 1247, page 19) | |
| Wheat flour | 10.000 kg |
| Wheat powder | 1.500 kg |
| Milk powder | 0.500 kg |
| Sifted sugar | 0.100 kg |
| Lecithin | 0.050 kg |
| Yolk of egg | 0.600 kg |
| Groundnut oil | 0.050 kg |
| Salt | 0.035 kg |
| Soda | 0.075 kg |
| Water | 18–20 l |

According to the invention, a water to flour ratio of about 1.6:1 is used when preparing the batter. The fat content of the batter, which is introduced by means of the vegetable oil, is preferably in a ratio of vegetable oil to flour of about 7:100 and in the case of the particularly preferred wafers makes up 2.4%, based on the finished batter.

The amount of rising agents, based on the finished batter, is preferably 0.08% by weight and particularly good results are achieved when 0.04% by weight of sodium bicarbonate and 0.04% by weight of ammonium bicarbonate, in each case based on the batters, are used as the rising agents.

Sweeteners which can be used according to the invention are all the sweetening substances which can be used in the foodstuff industry. As a rule, the sweetener used is sugar, preferably sucrose; however, it is also possible to use other sugars, such as mannitol, xylitol, fructose and the like, in addition to or in place of sucrose and, finally, it is also possible to dispense with sugar completely and to use synthetic sweeteners. The amount of sweeteners depends on the desired degree of sweetness of the wafer and when a sugar, preferably sucrose, is used the amount is of up to 1.2% by weight, based on the batter. If too high an amount of sugar is used, there is a danger that on baking on the hot wafer iron the batter will bake on and/or the wafer will brown too much.

It is advantageous also to use magnesium hydroxide/carbonate, preferably in an amount of about 0.06% by weight, based on the batter. The ease of separation of the wafer from the wafer iron is increased by the use of magnesium hydroxide/carbonate.

The vegetable oil is dispersed in the batter by means of an emulsifier. Emulsifiers which can be used are the emulsifiers customary in the foodstuff industry and the preferred emulsifier is lecithin, specifically in an amount of about 0.15% by weight, based on the finished batter.

In order to adjust the flavour and colour of the wafer, it is also possible to introduce cocoa powder, preferably in an amount of about 1.5% by weight, into the batter.

According to the process, the procedure is first to introduce seasoning—as a rule cooking salt is used for this—and rising agents and the sweeteners into water and to disperse these, specifically with the addition of soya flour. The addition of soya flour to wafer recipes is indeed known but in the case of the known recipes is, however, generally not recommended because it results in too extensive browning. In the wafers according to the invention, about 1.65% by weight, based on the finished batter, of soya flour is preferably employed. A suitable soya flour is the product marketed under the tradename NURUPAN (registered trademark of the Deutsche Edelsoja GmbH).

Flour and whole milk powder are then added to the resulting aqueous solution or suspension, in a ratio of water to flour of about 1.6:1. The flour used is preferably a mixture of in the main wheat flour with a smaller amount of rye flour, preferably in a weight ratio of 94:6. Based on the batter, preferably about 31% by weight of wheat flour and 2% by weight of rye flour are used.

In addition, it can be advantageous also to use wheat starch, preferably in an amount of about 1% by weight, based on the batter.

Vegetable oil and an emulsifier for the oil, preferably lecithin, are then added in the amounts or ratios indicated above. The mass thus obtained is then beaten in a beater with the formation of a homogeneous batter. High-speed beating machines are most suitable for this. Depending on the type of machine, the beating time is 3 to 30 minutes and preferably about 10 minutes.

The batter which has been beaten and mixed well is now introduced in metered amounts onto a wafer iron. Whilst with the conventional wafer recipes and processes the baking temperature is about 250° to 300° C. with the same heat at the top and the bottom and the baking times are about 2½ to 4 minutes, considerably lower baking temperatures are employed according to the invention, there being a temperature difference of about 10° to 20° C. between the lower and the upper wafer iron and the colder wafer iron having a temperature of at least 150° C. There is an upper temperature limit for the hotter wafer iron of about 200° C.

Since it is desired to manufacture wafers with a smooth, dense surface, it is necessary that at least one side of the wafer is smooth and this necessitates that the outer skin of that surface of the wafer iron which produces the wafer half must be smooth. However, it is also possible for both halves of the wafer iron to be smooth.

Of course, care must be taken that a sufficient surface area for the escape of steam is ensured. This is because the amount of water contained in the batter must be vaporised within a specific preferred time at the temperatures indicated. Accordingly, the steam escape surfaces will be so chosen that they correspond to the requisite increased amount of steam which is to escape and it is possible to increase the number of orifices or to enlarge the orifices themselves.

A preferred wafer iron temperature is a temperature of 175° C. for the upper wafer iron and of 160° C. for the lower wafer iron.

EXAMPLE

A preferred wafer according to the invention has the following recipe (based on 1 kg of batter)

| | |
|---|---|
| Water | 560 |
| Whole Milk powder | 16.5 |
| "NURUPAN" soya flour | 16.5 |
| Wheat flour, type 550 | 322.1 |
| Rye flour, type 815 | 20 |
| Groundnut oil | 24 |
| Wheat starch | 10 |
| Cooking salt | 1 |
| Sodium bicarbonate | 0.4 |
| Ammonium bicarbonate | 0.4 |
| Lecithin | 1.5 |
| Sugar | 12 |
| Magnesium hydroxide/carbonate | 0.6 |
| Cocoa powder (10/12) | 15 |
| | 1,000 g |

In order to produce 1 kg of batter, the cooking salt and also the sodium bicarbonate and the ammonium bicarbonate, as rising agents, and the magnesium hydroxide/carbonate and the sugar are introduced into water and these constituents are stirred for about 1 minute, the soya flour being added at a uniform rate.

The flour, that is to say wheat flour and rye flour, and also the whole milk powder, the wheat starch and the cocoa powder are then dispersed in the aqueous solution and the groundnut oil and lecithin as the emulsifier are then added. The mass thus obtained is beaten for about 10 minutes in a beater. The batter thus obtained is optionally passed through a fine sieve in order to retain any small particles which are still contained in the batter and which could influence the uniform structure of the finished wafer. The batter is then applied in metered amounts to the wafer iron, the lower wafer iron having a temperature of 175° C. and the upper wafer iron having a temperature of only 160° C. The two wafer irons are so arranged relative to one another during the baking operation that a wafer thickness of about 2.8 mm results. The baking operation has ended after 3 minutes.

In the present example, two wafer irons of different shaping with smooth surfaces are employed in order to form a hollow wafer consisting of an upper and a lower part. The two wafer irons are designed in a known manner for baking a relatively large number of hollow wafer halves through at the same time. These wafer sheets are cut into individual wafer halves using suitable devices. The dimensions of the individual wafer halves were 25×115 mm. The lower halves of the wafers had a trapezoid-shaped cross-section and the side surfaces extended obliquely downwards at an angle of about 30° over a length of 5 mm. When clamped at both sides, a hollow wafer half shaped in this way had a breaking strength of, on average, 260 g when subjected to a central load with a flat stamp with a cross-sectional area of 3 cm². The upper wafer half was shaped to be approximately semi-circular, the doming extending to a height of about 12 mm. With otherwise identical dimensions of the upper part (25×115 mm), the breaking strength when the same test was carried out using a stamp having a front face suited to the external shape of the wafer surface was, on average, 385 g, with a water content of the wafer of 5.0% H₂O for the lower part and 4.0% H₂O for the upper part.

The wafers according to the invention not only have a considerable breaking strength, which is even surprising for their thickness of only 2.5 to 3 mm, but are also distinguished by long-lasting good organoleptic properties. Even on prolonged storage in the filled or unfilled state, they retain their crispness and their appearance and suffer no change in flavour.

The breaking strength of the wafer according to the invention was compared with that of wafers of the prior art, that is to say with that of wafers which are obtainable commercially. Loading to break was carried out with a Brabender plastograph using a spring pressure of 2 kg and a speed of 8.5 seconds. The distance between the supports was 8 cm. All of the wafers to be tested were dried at 100° C. for 2 hours prior to the test and the residual water content was determined after carrying out the measurement. Although, in the case of the samples examined, this residual water content does vary slightly, the different water contents probably have no influence on the different breaking strengths measured.

The wafers 1a and 1b are wafers according to the invention. Wafer 1a has a trapezoid cross-section and wafer 1b has a semi-circular, domed cross-section. Wafers 2 to 8 were all of the same size as the wafers according to the invention which were tested, but were of different thicknesses. Moreover, they did not have smooth surfaces but square patterns. The batter composition of the comparison wafers is not known in detail, nor are the precise manufacturing conditions. However, it can be assumed that, in principle, the composition and process conditions for manufacture were similar to those for the wafers according to the invention. The different and better characteristics of the wafers according to the invention are apparently due to the conditions indicated in the patent claims being maintained. It is true that some of these conditions are known from the prior art, but it is the combination of the conditions which gives wafers according to the invention with the advanced and superior characteristics.

TABLE

| Product | Wafer size | Break at a load of (g): | | | | Average value | % H₂O |
|---|---|---|---|---|---|---|---|
| Wafer 1a | 90 × 25 mm × 2-3 | 280 | 230 | 230 | 300 | 260 | 5.0 |
| Wafer 1b | 90 × 25 mm × 2 | 380 | 390 | 360 | 410 | 385 | 5.0 |
| Wafer 2 | 90 × 25 mm × 5 | 90 | 85 | 80 | 85 | 85 | 3.7 |
| Wafer 3 | 90 × 25 mm × 3 | 60 | 60 | 65 | 60 | 61 | 3.8 |
| Wafer 4 | 90 × 25 mm × 2 | 25 | 25 | 25 | 25 | 25 | 4.9 |
| Wafer 5 | 90 × 25 mm × 2 | 45 | 40 | 40 | 40 | 41 | 4.6 |
| Wafer 6 | 90 × 25 mm × 4 | 200 | 220 | 200 | 210 | 208 | 4.4 |
| Wafer 7 | 90 × 25 mm × 4 | 230 | 225 | 230 | 205 | 223 | 3.1 |
| Wafer 8 | 90 × 25 mm × 4 | 210 | 200 | 215 | 210 | 209 | 3.6 |

I claim:
1. Wafers with a smooth dense surface and a cell-like internal structure for use as filled wafers, consisting of two or more wafer sheets, prepared by a process comprising the steps of:
   A. Producing a batter by employing the following ingredients in the approximate indicated amounts per each 1 kg. of batter:
   (a) Introducing 1 g. of cooking salt, 0.4 g. of sodium bicarbonate and 0.4 g. of ammonium bicarbonate and also 0.6 g. of magnesium hydroxide/carbonate and 12 g. of sugar into 560 g. of water by stirring these constituents for one minute, 16.5 g. of soya flour being added at the same time;
   (b) Dispersing 322 g. of wheat flour, 20 g. of rye flour, 16.5 g. of whole milk powder, 10 g. of wheat starch and 15 g. of cocoa powder in the aqueous solution according to A(a);
   (c) Adding 24 g. of groundnut oil and 1.5 g. of lecithin as an emulsifier for the oil; and
   (d) Beating the batter in a beater for ten minutes; wherein the concentration of the sugar is about 1.2% by weight of the batter and the concentration of milk solids is at least about 1.65% by weight of the batter;
   B. Applying the batter in metered amounts to wafer irons having upper and lower irons;
   The lower wafer iron being heated to a temperature of 170° C.; and
   (b) The upper wafer iron being heated to a temperature of 160° C.;

C. Baking the batter in the wafer iron for a period of 2.5 to 3 minutes to a wafer thickness of 2.5 to 3 mm.

2. The process for the manufacture of wafers with a smooth dense surface and a cell-like internal structure for use as a filled wafer, consisting of two or more wafer sheets, prepared by a process comprising the steps of:

A. Producing a batter by employing the following ingredients in the approximate indicated amounts per each 1 kg. of batter:
 (a) Introducing 1 g. of cooking salt, 0.4 g. of sodium bicarbonate and 0.4 g. of ammonium bicarbonate and also 0.6 g. of magnesium hydroxide/carbonate and 12 g. of sugar into 560 g. of water by stirring these constituents for one minute, 16.5 g. of soya flour being added at the same time, thereby forming an aqueous mixture;
 (b) Dispersing 322 g. of wheat flour, 20 g. of rye flour, 16.5 g. of whole milk powder, 10 g. of wheat starch and 15 g. of cocoa powder in the aqueous solution according to step A(a), thereby forming a flour-containing mixture;
 (c) Adding 24 g. of groundnut oil and 1.5 g. of lecithin as an emulsifier for the oil thereby forming a batter; and
 (d) Beating the batter in a beater for ten minutes; wherein the concentration of the sugar is about 1.2% by weight of the batter and the concentration of milk solids at least about 1.65% by weight of the batter;

B. Applying the batter in metered amounts to wafer irons having upper and lower irons,
 (a) The lower wafer iron being heated to a temperature of 175° C.; and
 (b) The upper wafer iron being heated to a temperature of 160° C.;

C. Baking the batter through in the wafer iron for a period of 2.5 to 3 minutes to a wafer thickness of 2.5 to 3 mm.

* * * * *

UNITED STATES PATENT AND TRADEMARK OFFICE
CERTIFICATE OF CORRECTION

PATENT NO. : 4,629,628

DATED : December 16, 1986

INVENTOR(S) : Giuseppe Negro

It is certified that error appears in the above-identified patent and that said Letters Patent is hereby corrected as shown below:

Col. 2, lines 48-49, delete "ammonium carbonate" and insert therefor -- ammonium bicarbonate --.

Col. 6, line 65, claim 1, before the line beginning "The lower wafer" insert -- (a) --.

Signed and Sealed this

Seventeenth Day of March, 1987

Attest:

DONALD J. QUIGG

Attesting Officer

Commissioner of Patents and Trademarks